April 29, 1969
J. K. TURNER
3,441,655
COUPLING FOR FLEXIBLE TUBING
Filed May 23, 1968
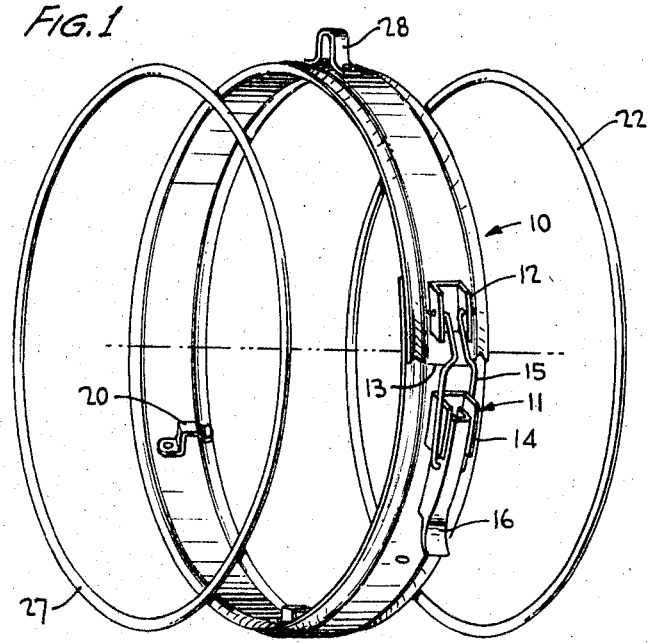
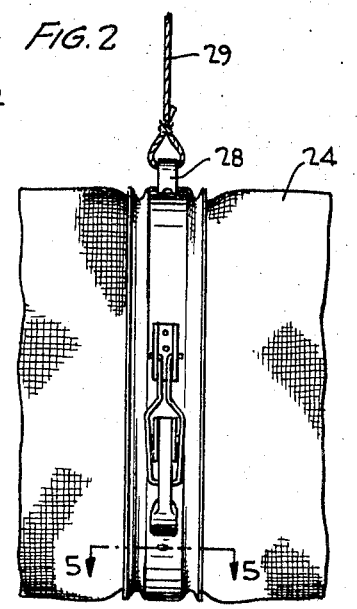
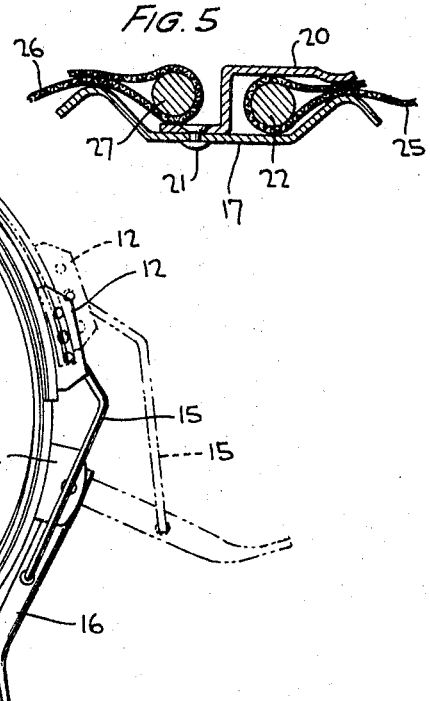
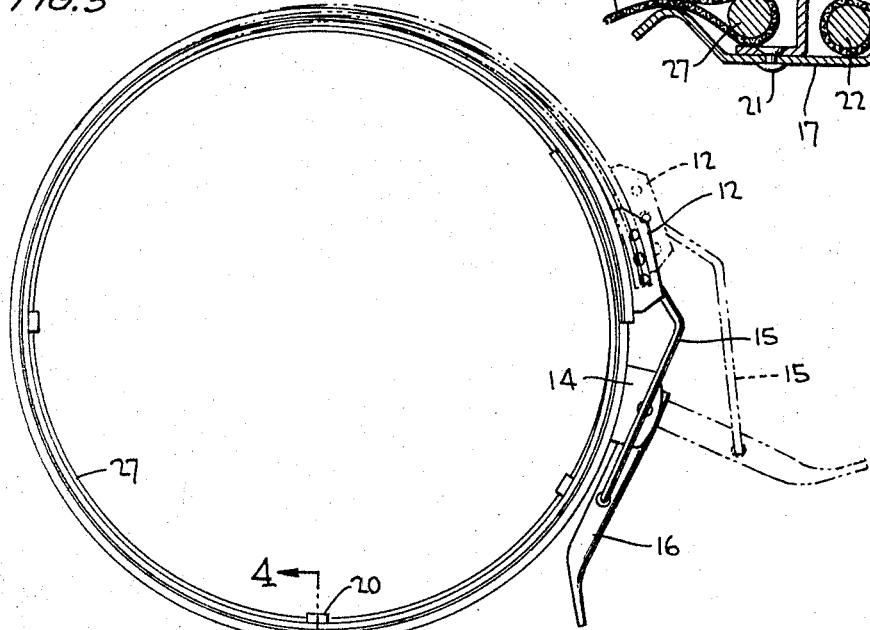
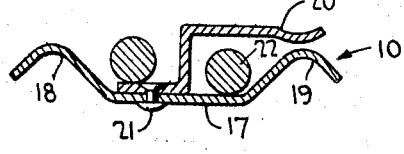
INVENTOR,
JAMES K. TURNER
BY
Watson, Cole, Grindle & Watson
ATTORNEYS

United States Patent Office 3,441,655
Patented Apr. 29, 1969

3,441,655
COUPLING FOR FLEXIBLE TUBING
James K. Turner, Warsaw, Ind., assignor to American Brattice Cloth Corporation, Winona Lake, Ind., a corporation of Indiana
Filed May 23, 1968, Ser. No. 731,478
Int. Cl. F16l 31/00, 23/00; H01b 7/00
U.S. Cl. 174—47      4 Claims

ABSTRACT OF THE DISCLOSURE

A device for coupling two sections of flexible tubing such as is used for ventilation of mines and the like, the coupling device being so constructed and arranged that one section of tubing remains in secure engagement with the coupling device while the latter is in expanded position for receiving the end of a further section of tubing. The coupling device comprises a resilient, compressible split rim adapted to be selectively compressed and released through the use of a toggle-type fastener which, in one position, tightly clamps the rim against rigid rings defining the adjacent ends of respective tubing sections. Release of the fastening device enables installation or removal of one of said rings and the corresponding tubing section while retaining the other ring and tubing section in engagement with the split rim.

Background of the invention

In underground mining, and in similar situations, it is frequently necessary to provide a flow of fresh air to the working areas through the use of flexible ventilation tubing, which must be frequently moved or increased in length by adding new sections of tubing. To efficiently move the tubing or add a new section requires the use of a coupling device which is simple in operation under conditions of inadequate lighting. Couplings which become disengaged from both sections of tubing, when released, are difficult to operate in poor light and under cramped conditions. Also, when the coupling device engages two sections of tubing, the bond must be secure to insure the uninterrupted flow of an adequate supply of air.

Again, in the course of moving the mining machinery in the close quarters of a mining shaft it occasionally happens that a section of ventilation tubing is torn or damaged. Since this tubing is supplied in substantial lengths, it becomes expedient to provide a feasible means of utilizing a coupling on the undamaged section of tubing, by removing the damaged portion from the tubing and reattaching the coupling to the undamaged portion, without removal of the tubing to a repair shop. Lastly, ventilation tubing of the type in question consists essentially of a fabric cover supported internally by a wire helix, and it is necessary that the tubing be grounded in order to discharge static electricity without sparking.

The present invention provides a coupling device which may be quickly and easily manipulated under cramped and poorly lighted conditions, to add a new section of tubing when required, or to enable the reuse of a damaged section of tubing. The coupling device remains attached to one section of tubing while another section is being installed, thus facilitating its use under the aforesaid adverse conditions. Also, the coupling device of the present invention provides a convenient means of effectively grounding both sections of tubing which it connects.

The objects of the invention are to provide a device for coupling two sections of flexible tubing which device possesses the advantages and achieves the results mentioned above.

More specifically, it is an object of the invention to provide a device for coupling two sections of flexible tubing, comprising a compressible split circular rim of resilient material, releasable means for compressing the rim to reduce its diameter, which rim is formed to provide an annular center portion of relatively larger internal diameter flanked by annular internal projections of equal, relatively smaller internal diameters, a plurality of angularly spaced, pivotally movable clamp members each permanently secured at one end of the inner surface of the aforesaid annular center portion and movable to a position wherein its other end overlies with close clearance one of said annular projections, and two substantially rigid rings each having an outside diameter substantially equal to the internal diameter of said annular center portion, and larger than the internal diameter of said annular projections, when the rim is in compressed condition. The clips are movable to positions in which a portion of each clip overlies one of said rings and prevents its removal from the rim when the latter is in released, or uncompressed, condition.

A further object is the provision of a device of the character described, including means for grounding the coupling device and the connected tubing sections.

Other and further objects, features and advantages will be apparent from the description which follows, read in connection with the accompanying drawings, in which:

FIGURE 1 is an exploded perspective view of a coupling device constructed in accordance with the invention;

FIGURE 2 is a side elevation of the device of FIGURE 1 as it appears in use;

FIGURE 3 is an end elevation of the coupling device showing the split rim both in compressed and in released positions, the latter being shown in dotted lines;

FIGURE 4 is a sectional view on line 4—4 of FIGURE 3; and

FIGURE 5 is a sectional view on line 5—5 of FIGURE 2.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring now to the drawings, a coupling device constructed in accordance with the invention comprises a split rim 10 of resilient material, preferably spring steel, adapted to be adjusted between compressed and expanded positions by means of a toggle device 11, one fixed portion 12 of which is secured to the rim 10 on one side of the split 13 while the other fixed portion 14 of the toggle device is secured to the rim on the other side of the split 13. The portions 12 and 14 are connected by means of a wire yoke 15, the respective ends of which are pivoted to the portion 12 and to a handle portion 16 which in turn is pivoted to the fixed portion 14. When the handle 16 is in the full line position shown in FIGURE 3 the rim 10 is tightly held in compressed position with the split 13 securely closed while, when the handle 16 is in the dotted line position illustrated in FIGURE 3, the resilience of the rim 10 causes it to expand and to separate at the split 13.

As best seen in FIGURE 4, the rim 10 is formed with an annular central portion 17 flanked by two annular inwardly projecting portions or ridges 18 and 19. A plurality consisting of three or more clips 20 are secured, as by rivets 21 to the inner surface of the annular central portion 17 of the rim and are movable angularly about the rivets 21 so as to enclose or to release a rigid ring member 22. A section 24 of flexible tubing is secured at one end to the ring 22 by wrapping the end edge of the textile material or the like 25 about the ring 22 and folding it back upon itself to enclose the ring 22 which, when the clips 20 are in the position shown in FIGURE 5, is firmly secured within the rim 10 even when the latter is in expanded position. The clips 20 also serve to retain the material 25 in position around the ring 22.

When it is desired to add a section of tubing, the end edge of the tubing material 26 is wrapped around a further rigid ring 27 which is then placed in engagement with the annular central portion 17 of the split rim and the toggle device 11 is moved to the position shown in solid lines in FIGURE 3, thus clamping the rim 10 tightly against both rings 22, 27. This clamping action also serves to secure the fabric material tightly around the respective rings as well as securing the respective rings rigidly in spaced, substantially leak-proof relation within the rim 10.

Since one section of tubing is at all times maintained in engagement with the rim 10, whether in expanded or released position, the device may be easily manipulated, even under adverse conditions, to attach a further section of tubing without releasing the section to which it was previously attached.

A loop 28 (FIGURES 1 and 2) is riveted or otherwise conductively secured to the central portion 17 of the rim 10 and when the latter is suspended by a wire 29 from the roof or a wall of an underground structure, such as a mine shaft, the rim 10 is effectively grounded. The tubing is likewise grounded by exposing a portion of the helical wire internal support (not shownw) so as to be in electrical contact with any part of the rim 10 or a clip 20, thus effectively grounding the entire tubing section.

Having thus described the invention, what is claimed as new and desired to be secured by Letters Patent is:

1. Device for coupling two tubular conduits of flexible material, comprising a compressible split circular rim of resilient material, means for compressing said rim to reduce its diameter, said rim being formed to provide an annular center portion of relatively larger internal diameter flanked by annular projectison of equal, relatively smaller internal diameters, a plurality of angularly spaced, pivotally movable clip members each permanently secured at one end to the inner surface of said annular center portion and movable to a position wherein its other end overlies and nearly touches one of said annular projections, and two circular substantially rigid rings each having an outside diameter substantially equal to the internal diameter of said annular center portion, and larger than the internal diameter of said annular projections, when said rim is compressed, the material at one end of each said conduit enclosing one of said rigid rings and being turned back upon itself whereby compression of said split rim grips said material tightly around and against said ring, said clips being movable to positions overlying one of said rings and conduits and preventing their removal from said rim when the latter is in uncompressed condition.

2. Device as defined in claim 1, said rim, clip members and rings being of electrically conductive material, said rim having permanently secured to its outer surface an electrically conductive member for connection to a ground wire serving as means for suspending said device from the inner surface of an underground structure.

3. A device as defined in claim 1, said compressing means being of the toggle type wherein movement of an actuating lever to a position beyond dead center serves to lock said rim in compressed position.

4. A device as defined in claim 1, each said clip comprising two substantially parallel, longitudinally and laterally offset portions joined by an intermediate portion lying substantially at right angles to and joining the adjacent ends of said offset portions, one of said offset portions being pivotally secured to said annular center portion of said rim and said other offset portion overlying one of said annular projections with insufficient clearance to permit passage therebetween of one of said rings.

References Cited

UNITED STATES PATENTS

| | | | |
|---|---|---|---|
| 1,211,067 | 1/1917 | Braly | 285—260 X |
| 1,370,316 | 3/1921 | Houdini | 285—311 X |
| 1,440,814 | 1/1923 | Bins | 285—260 X |
| 2,245,037 | 6/1941 | Hersey | 285—260 X |
| 2,804,095 | 8/1957 | Schavenburg | 285—409 X |

FOREIGN PATENTS

| | | |
|---|---|---|
| 547,628 | 9/1956 | Italy. |
| 409,550 | 10/1966 | Switzerland. |

THOMAS F. CALLAGHAN, *Primary Examiner.*

U.S. Cl. X.R.

285—260, 409